US008058213B2

(12) United States Patent
Rediger et al.

(10) Patent No.: US 8,058,213 B2
(45) Date of Patent: Nov. 15, 2011

(54) INCREASING BUOYANCY OF WELL TREATING MATERIALS

(75) Inventors: Richard Rediger, Conyers, GA (US); Jesse Petrella, McDonough, GA (US); Michael Joseph Aron, Snelleville, GA (US); Bedford W. Fennell, Holcomb, MS (US)

(73) Assignee: Georgia-Pacific Chemicals LLC, Atlanta, GA (US)

( * ) Notice: Subject to any disclaimer, the term of this patent is extended or adjusted under 35 U.S.C. 154(b) by 347 days.

(21) Appl. No.: 11/747,359

(22) Filed: May 11, 2007

(65) Prior Publication Data
US 2008/0277115 A1 Nov. 13, 2008

(51) Int. Cl.
C09K 8/74 (2006.01)
E21B 43/267 (2006.01)

(52) U.S. Cl. ............... 507/269; 507/924; 166/280.1; 166/280.2

(58) Field of Classification Search .............. 507/269, 507/924; 166/280.1, 280.2; 428/403, 404
See application file for complete search history.

(56) References Cited

U.S. PATENT DOCUMENTS

| | | | |
|---|---|---|---|
| 3,815,680 A | 6/1974 | McGuire et al. |
| 3,929,191 A | 12/1975 | Graham et al. |
| 4,073,343 A | 2/1978 | Harnsberger |
| 4,160,483 A | 7/1979 | Thomas et al. |
| 4,183,813 A | 1/1980 | Black et al. |
| 4,222,444 A | 9/1980 | Hamilton |
| 4,336,842 A | 6/1982 | Graham et al. |
| 4,439,489 A | 3/1984 | Johnson et al. |
| 4,493,875 A | 1/1985 | Beck et al. |
| 4,518,040 A | 5/1985 | Middleton |
| 4,527,627 A | 7/1985 | Graham et al. |
| 4,547,468 A | 10/1985 | Jones et al. |
| 4,569,394 A | 2/1986 | Sweatman et al. |
| 4,585,064 A | 4/1986 | Graham et al. |
| 4,665,990 A | 5/1987 | Perlman |
| 4,852,650 A | 8/1989 | Jennings et al. |
| 4,869,960 A | 9/1989 | Gibb et al. |
| 4,888,240 A | 12/1989 | Graham et al. |
| 4,923,714 A | 5/1990 | Gibb et al. |
| 5,005,641 A | 4/1991 | Mohaupt |
| 5,128,390 A | 7/1992 | Murphey et al. |
| 5,188,175 A | 2/1993 | Sweet |
| 5,217,074 A | 6/1993 | McDougall et al. |
| 5,311,946 A | 5/1994 | Harry et al. |
| 5,316,792 A | 5/1994 | Harry et al. |
| 5,318,382 A | 6/1994 | Cahill |

(Continued)

FOREIGN PATENT DOCUMENTS

CA 1057649 A1 7/1979

(Continued)

OTHER PUBLICATIONS

"Density of Various solids", CRC Handbook of Chemistry and Physics, 90th edition, 2009-2010, section15, p. 39.*

(Continued)

Primary Examiner — Timothy J. Kugel
Assistant Examiner — Aiqun Li
(74) Attorney, Agent, or Firm — Michael S. Kerns

(57) ABSTRACT

A composite proppant having an increased buoyancy comprising a proppant substrate such as a porous ceramic or a silica sand coated with a material of a lesser actual density than the apparent density of the proppant substrate to increase the buoyancy of the composite proppant.

20 Claims, 1 Drawing Sheet

U.S. PATENT DOCUMENTS

| | | | |
|---|---|---|---|
| 5,330,005 A | 7/1994 | Card et al. |
| 5,370,184 A | 12/1994 | McDougall et al. |
| 5,411,093 A | 5/1995 | Jennings, Jr. |
| 5,422,183 A | 6/1995 | Sinclair et al. |
| 5,425,994 A | 6/1995 | Harry et al. |
| 5,439,055 A | 8/1995 | Card et al. |
| 5,492,178 A | 2/1996 | Nguyen et al. |
| 5,500,174 A | 3/1996 | Scott |
| 5,501,274 A | 3/1996 | Nguyen et al. |
| 5,501,275 A | 3/1996 | Card et al. |
| 5,520,250 A | 5/1996 | Harry et al. |
| 5,578,371 A | 11/1996 | Taylor et al. |
| 5,582,249 A | 12/1996 | Caveny et al. |
| 5,639,806 A | 6/1997 | Johnson et al. |
| 5,656,176 A | 8/1997 | Scott |
| 5,697,440 A | 12/1997 | Weaver et al. |
| 5,728,302 A | 3/1998 | Connor et al. |
| 5,775,425 A | 7/1998 | Weaver et al. |
| 5,787,986 A | 8/1998 | Weaver et al. |
| 5,833,000 A | 11/1998 | Weaver et al. |
| 5,837,656 A | 11/1998 | Sinclair et al. |
| 5,839,510 A | 11/1998 | Weaver et al. |
| 5,853,048 A | 12/1998 | Weaver et al. |
| 5,916,933 A | 6/1999 | Johnson et al. |
| 5,929,437 A | 7/1999 | Elliott et al. |
| 5,948,734 A | 9/1999 | Sinclair et al. |
| 5,955,144 A | 9/1999 | Sinclair et al. |
| 5,964,291 A | 10/1999 | Bourne et al. |
| 6,017,854 A | 1/2000 | Van Slyke |
| 6,047,772 A | 4/2000 | Weaver et al. |
| 6,059,034 A | 5/2000 | Rickards et al. |
| 6,114,410 A | 9/2000 | Zbetzold |
| 6,116,342 A | 9/2000 | Clark et al. |
| 6,209,643 B1 | 4/2001 | Nguyen et al. |
| 6,330,916 B1 | 12/2001 | Rickards et al. |
| 6,364,018 B1 | 4/2002 | Brannon et al. |
| 6,406,789 B1 | 6/2002 | McDaniel et al. |
| 6,439,309 B1 | 8/2002 | Matherly et al. |
| 6,439,789 B1 | 8/2002 | Martherly et al. |
| 6,528,157 B1 | 3/2003 | Hussain et al. |
| 6,582,819 B2 | 6/2003 | McDaniel et al. |
| 6,626,241 B2 | 9/2003 | Nguyen |
| 6,632,527 B1 | 10/2003 | McDaniel et al. |
| 6,732,800 B2 | 5/2004 | Acock et al. |
| 6,749,025 B1 | 6/2004 | Brannon et al. |
| 6,817,414 B2 | 11/2004 | Lee |
| 6,832,650 B2 | 12/2004 | Nguyen et al. |
| 6,892,813 B2 | 5/2005 | Nguyen et al. |
| 7,073,581 B2 | 7/2006 | Nguyen et al. |
| 7,153,575 B2 | 12/2006 | Anderson et al. |
| 7,210,528 B1 | 5/2007 | Brannon et al. |
| 7,244,492 B2 | 7/2007 | Sinclair et al. |
| 7,270,879 B2 | 9/2007 | McCrary |
| 7,426,961 B2 | 9/2008 | Stephenson et al. |
| 7,491,444 B2 | 2/2009 | Smith et al. |
| 7,624,802 B2 | 12/2009 | McCrary et al. |
| 7,713,918 B2 | 5/2010 | Stephenson et al. |
| 2003/0205376 A1 | 11/2003 | Ayoub et al. |
| 2003/0224165 A1 | 12/2003 | Anderson et al. |
| 2004/0040708 A1 | 3/2004 | Stephenson et al. |
| 2004/0094300 A1 | 5/2004 | Sullivan et al. |
| 2004/0200617 A1 | 10/2004 | Stephenson et al. |
| 2005/0019574 A1 | 1/2005 | McCrary |
| 2005/0028979 A1 | 2/2005 | Brannon et al. |
| 2005/0059558 A1 | 3/2005 | Blauch et al. |
| 2005/0096207 A1 | 5/2005 | Urbanek |
| 2006/0035790 A1 | 2/2006 | Okell et al. |
| 2006/0037755 A1 | 2/2006 | Knobloch |
| 2006/0078682 A1* | 4/2006 | McDaniel et al. ......... 427/372.2 |
| 2006/0146643 A1 | 7/2006 | Allen |
| 2007/0054121 A1* | 3/2007 | Weintritt et al. .............. 428/403 |
| 2008/0011477 A1 | 1/2008 | Rediger et al. |
| 2008/0202750 A1 | 8/2008 | Rediger et al. |
| 2008/0283243 A1 | 11/2008 | Rediger et al. |

FOREIGN PATENT DOCUMENTS

| | | |
|---|---|---|
| CA | 1185778 | 4/1985 |
| CA | 1202882 | 4/1986 |
| CN | 1508390 A | 6/2004 |
| CN | 1730422 A1 | 2/2006 |
| EP | 0169412 A1 | 1/1986 |
| EP | 1400818 A2 | 3/2004 |
| EP | 0308257 A2 | 11/2008 |
| GB | 2050467 A | 1/1981 |
| GB | 2370054 A | 6/2002 |
| GB | 2426023 A | 11/2006 |
| WO | 99/27229 A1 | 6/1999 |
| WO | WO 2000/005302 | 2/2000 |
| WO | 03/011588 A1 | 2/2003 |
| WO | 03/023177 A2 | 3/2003 |
| WO | 03/089757 A1 | 10/2003 |
| WO | WO 2004/083600 | 9/2004 |
| WO | WO2004/092254 | 10/2004 |
| WO | 2005/000993 A1 | 1/2005 |
| WO | 2005/095202 A1 | 10/2005 |
| WO | 2006/034298 A2 | 3/2006 |
| WO | 2008/033225 A2 | 3/2008 |

OTHER PUBLICATIONS

International Search Report for PCT/US2007/072212 mailed on Nov. 27, 2007.
Currently pending U.S. Appl. No. 11/456,897, filed Jul. 12, 2006.
Currently pending U.S. Appl. No. 11/803,688, filed May 15, 2007.
Advances in Coalbed Methane, Hart Energy Publications, Chemical Week Associates, May 2003, pp. 1-16, Hart Publications, Houston, Texas, USA.
Conductivity Endurance Technology, Top Technology Solutions 2006, Sep. 2006, H04898, Halliburton.
International Search Report for PCT/US2008/062890, mailed Sep. 1, 2008, European Patent Office, Rijswijk, Netherlands.
International Search Report for PCT/US2008/063055, mailed Sep. 2, 2008, European Patent Office, Rijswijk, Netherlands.
International Search Report and Written Opinion of the International Searching Authority for PCT/US09/36326, mailed Jun. 26, 2009, nine pages, European Patent Office, Rijswijk, Netherlands.
Written Opinion of the International Searching Authority for PCT/US07/72212, mailed Nov. 27, 2007, six pages, European Patent Office, Rijswijk, Netherlands.
International Search Report and Written Opinion of the International Searching Authority for PCT/US08/62890, mailed Aug. 1, 2008, six pages, European Patent Office, Rijswijk, Netherlands.
International Search Report and Written Opinion of the International Searching Authority for PCT/US08/63055, mailed Aug. 13, 2008, seven pages, European Patent Office, Rijswijk, Netherlands.

\* cited by examiner

INCREASING BUOYANCY OF WELL TREATING MATERIALS

TECHNICAL FIELD

This invention relates to particulate compositions suitable for hydraulic fracturing treatments (i.e., as a composite proppant), suitable for gravel packing in sand control, or suitable for other well formation treatments. Specifically, the invention is directed to the use of a material having a lower density than the substrate attached through a binder as a coating on the substrate to enhance the buoyancy of a particulate composition (i.e., a proppant).

BACKGROUND

Proppants are used to keep open fractures created by hydraulic fracturing of a subterranean formation, e.g., in an oil or gas bearing strata. Typically, the fracturing is performed in a subterranean formation to increase oil or gas production. Fracturing is caused by injecting a viscous fracturing fluid at a high pressure into the well. As fractures are formed, a particulate material, referred to as a "propping agent" or "proppant" is placed in the formation to maintain the fracture in a propped open condition when the injection pressure is released. As a fracture forms, the proppants are carried into the well by suspending them in a fluid filling the fracture with a slurry of proppant. Upon release of the pressure, the proppants lodge in the fractures so that the fractures do not close once fracturing pressure is reduced. Using proppants increases production of oil and/or gas from a subterranean formation by providing highly conductive channels through the formation.

The maintenance of these channels provides increased flow of various fluids, e.g., hydrocarbons such as natural gas and oil.

Proppant materials that have been widely used include: (1) particulate sintered ceramics, typically aluminum oxide, silica, or bauxite, often with clay-like binders or other additives to increase the particulate's compressive strength, especially sintered bauxite; (2) natural, relatively coarse, sand, the particles of which are roughly spherical, generally called "frac sand" and (3) resin-coated particulates of (1) and (2), i.e., resin-coated proppant.

Unfortunately, each of these materials (as well as others) has a relatively high density (high specific gravity) that causes the proppants to settle rapidly once suspended in a transporting fluid, e.g., fracture fluid or frac fluid. In particular, such proppants generally have a density above 1.60 g/cc. and often above 3.50 g/cc.

Specific gravity is defined as the ratio of the density of the material or substance whose specific gravity is being determined to the density of a reference material, usually water, reported at a reference temperature (usually under a condition where the density of water is 1 gm/cc). Specific gravity is a dimensionless quantity. The density of a material or substance is the ratio of the mass of the material to the volume that the mass of material occupies (mass/volume) and is often reported in grams/cubic centimeters (gm/cc or g/cc) or grams/milliliter (gm/ml or g/ml).

When the proppant settles too rapidly from the frac fluid, the settlement interferes with positioning of the proppant throughout the fractured formation. To counteract this result, the fracturing fluid is often thickened to increase its viscosity and thus slow the rate of a specific proppant's settlement. One issue with using a higher viscosity fracturing fluid, however, is the increased amount of energy required to pump the fluid into the subterranean formations when the fractures are created and when proppant is delivered throughout the formation. In other words, more energy is required to pump thicker fluids.

Another method of reducing the rate of proppant settlement is to use proppants having a lower specific gravity (i.e., a higher buoyancy) such as hollow glass balls, walnut hulls and sealed porous ceramics. These types of proppants exhibit a lower apparent specific gravity. The apparent specific gravity is the measurement of the specific gravity of a porous solid or substance when the volume used in the density calculation is considered to include the porosity, i.e., the porous permeable interior, of the porous solid or substance. Thus, in the case of porous materials the apparent density is less than the intrinsic density of just the solid mass of material.

Since these proppants appear or perform as if they are less dense than silica sand or ceramic proppants) they tend to settle more slowly in a fluid. However, these types of proppants are generally less crush resistant and realistically are only satisfactorily used in shallower wells at 3,000 to 4,000 psi closure pressures. Many formations may experience closure stresses of 6,000 to 10,000 psi and higher.

In view of the foregoing, interest in developing new solutions to proppant design and transport in well recovery operations remains strong. In particular, particulate compositions (proppants) that have slower settlement times yet are able to function at higher closure stresses continue to be in demand.

BRIEF DESCRIPTION OF THE INVENTION

In accordance with the present invention, particulate compositions (proppants) having a higher buoyancy (i.e., a lower density and a lower specific gravity) and a broad closure pressure tolerance may be produced using traditional proppant materials such as (1) particulate sintered ceramics, typically aluminum oxide, silica, or bauxite, possibly with clay-like binders or other additives to increase the particulate's compressive strength, especially sintered bauxite and (2) natural, relatively coarse, sand, the particles of which are roughly spherical, generally called "frac sand," and well as newer high crush resistant proppant materials (3), as a substrate and applying or attaching, as a coating, a second, more buoyant (i.e., less dense) material to the substrate.

In one embodiment, less dense particles such as cork particles, lower density woody material, including saw dust, plastics, (e.g., phenolics, urethanes, polyesters, epoxies and ureas—especially foamed plastics) and the like are attached to the surface of a high crush resistant (such as a conventional) proppant substrate. The less dense particles may be attached to the proppant substrate using a variety of methods such as an adhesive coating. The amount of less dense particles affixed to the proppant substrate may range anywhere from about 0.1 to about 20% based on the type of the less dense particles and the proppant substrate. Cork particles, for example, may comprise 2% to 10% of the total weight of the coated composite proppant. (In the broader aspects of the invention, similar coatings of less dense materials may also be applied to low density proppant substrates such as hollow glass balls, walnut hulls and sealed porous ceramics to achieve similar effects).

In practicing the present invention, the material(s) or substance(s) to be attached to the proppant substrate should have an actual, inherent, or intrinsic specific gravity (i.e., not an apparent specific gravity) less than the specific gravity of the proppant substrate. For example, U.S. Pat. No. 4,493,875 describes a proppant construction in which a coating of glass microspheres embedded in an adhesive coats a conventional silica sand proppant. The material of the glass microspheres, i.e., the glass, has substantially the same specific gravity (density) as the silica sand substrate (i.e., the same inherent, intrinsic or actual specific gravity or density). However, because of the hollow nature of the microspheres, they have a lower "apparent" specific gravity. Unfortunately, when such microspheres are damaged during use (as they unavoidably are given the rigors encountered during use as a proppant), and thus expose the interior of the spheres to the surrounding environment, the material no longer acts to reduce the density of the associated proppant. As a result, the proppant losses its buoyancy and fails to be carried adequately by the carrier fluid (frac fluid).

The present invention avoids this inherent problem with the prior art since the present invention instead is directed to the use of materials whose actual, intrinsic, or inherent specific gravity (actual, intrinsic, or inherent density) is lower than the specific gravity (actual or apparent) of the proppant substrate. Applicant submits that the nature of the material used in the present invention exhibits an improved integrity relative to the hollow microspheres used in the prior art.

Composite proppants having a core of a high crush-resistant proppant substrate with an intrinsically less dense coating material (as noted above) adhered to its surface may be prepared using a variety of processes. In one example, a crush resistant proppant substrate, e.g., a ceramic or silica sand particle, may be heated and mixed with an adhesive resin and a particulate lower density coating material to form the composite proppant. As used throughout the specification and claims the phrase "particulate lower density coating material" means a particulate substance having an actual, intrinsic, or inherent specific gravity (or density) lower than either the actual (e.g., intrinsic), or the apparent specific gravity (or density) of the proppant substrate. The resin is added to the mixture as an adhesive for attaching the particulate lower density coating material to the surface of the proppant substrate. After mixing the proppant substrate, the adhesive resin and the lower density particulate coating material for a predefined period of time, the mixture then is discharged screened and cooled. The coating of the lower density material particles may comprise a single particulate material or may include combinations of particulate materials depending on intended use.

DETAILED DESCRIPTION OF THE INVENTION

Figure 1:
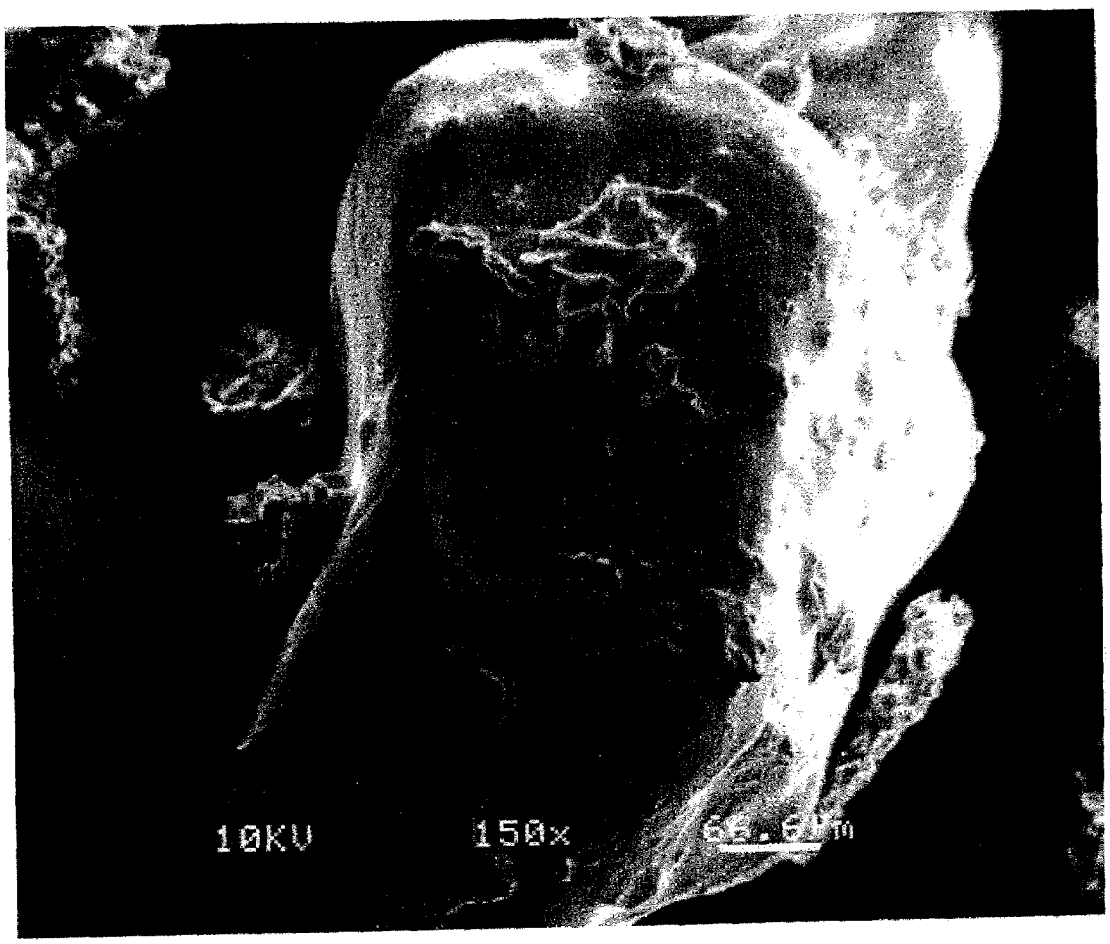
FIG. 1 illustrates a scanning electron microscopic image of a composite proppant of the present invention.

The present invention relates to a low density (low specific gravity) composite proppant (i.e., a composite proppant of increased buoyancy) to be used in petroleum and gas production to "support/prop" hydraulic fractures in a subterranean formation. The proppant keeps the hydraulic fractures open for the inflow of petroleum and/or natural gas, and can substantially improve the yield per well. More particularly, the invention relates to a coated proppant substrate as a composite proppant of increased buoyancy. The invention also relates to methods for making and using these composite proppants.

By making and using composite proppants of lower density (i.e., of increased buoyancy), power consumption associated with pumping a fracturing fluid and proppants into subterraneous formations during well drilling operations may be reduced. That is, the viscosity of the fracturing fluid does not need to be increased as much as currently employed in order to reduce the settlement rate of the proppant. Since higher viscosity fluids require more power to pump them at a predefined pressure than do lower viscosity fluids, using a lower viscosity fluid consumes less power and results in lower energy costs. The present invention allows lower viscosity fluids to be used since the lower density proppants of the present invention settle at a lower rate due to their increased buoyancy. Furthermore, the slower settlement rate of the lower density proppants of the present invention allows the proppants to be distributed over a larger subterranean area.

According to one or more arrangements of the present invention, fractures in subterranean formations may be created by injecting a treating fluid (e.g., a fracture fluid, or frac fluid) into the subterranean formation. Procedures for hydraulically fracturing a formation are known to those skilled in the art and do not form part of the present invention (see for example U.S. Pat. Nos. 6,059,034 and 6,330,916). The treating fluid (hydraulic fracturing fluid) is injected at a high pressure to force the creation of subterraneous fractures. In oil drilling operations, subterraneous fractures may increase the size and number of channels through which oil and/or other hydrocarbons may be extracted. Creating fractures in a subterranean formation generally enhances the flow of the hydrocarbon material (e.g., oil) being extracted during recovery operations.

To maintain these fractures open, as is well known, proppants are injected and lodged in the fractures. Without a supporting structure (provided by the proppant) to hold the fractures open, the fractures likely would close to some extent impeding the subsequent flow of the hydrocarbon fluid through the fractured formation. Proppants are typically transferred in the initial injection of fracture fluid or may be included in a subsequent injection of fluid into the formation for retaining the fractured formation in a open position. In many instances, fractures may be created in areas far from the fluid injection point. Thus, proppants need to remain suspended in the treating or fracture fluid long enough for the proppants to be carried to the farthest fractures.

The use of a particulate lower density material, in accordance with the present invention, as a coating on the proppant substrate produces a composite proppant having a lower specific gravity (i.e., a higher buoyancy) and allows the proppants to settle at a lower rate from a particular fluid. Thus, the composite proppant of the present invention travels farther through the subterraneous formation before settling in the fracture, than would otherwise be the case. Once a coated composite proppant of the present invention reaches a fracture, the proppants lodge within the fracture and may agglomerate to form a stable framework within the fracture to provide a fluid permeable region.

One advantage of using a composite proppant having a lower specific gravity (i.e., a higher buoyancy) in accordance with the present invention is that the fluid viscosity needed to carry the proppant the desired distance into the fractured formation can accordingly be reduced, relative to the viscosity of the fluid that otherwise would be needed for the unmodified proppant. This viscosity reduction reduces energy costs associated with the hydrocarbon recovery operation.

In order to prepare the composite proppant of the present invention, a crush resistant proppant substrate, which typically comprises a particulate material, such as sand, a naturally occurring mineral, such as fused zirconia, a ceramic, such as sintered bauxite, or a sintered alumina, or another non-ceramic refractory such as milled or glass beads, as well as their resin-coated counterparts, is coated with a less dense particulate material, such as cork particles. The proppant substrate of the composite proppant of the present invention should be sufficiently strong to withstand a closure pressure of at least about 3,000 psi, preferably the crush resistance of the proppant should be sufficient to withstand a closure pressure of at least about 5,000 psi, and more preferably the crush resistance of the proppant should be sufficient to withstand a closure pressure of at least about 7,500 psi and higher.

The proppant substrate, such as sand or a ceramic (optionally pre-coated with a resin), generally has a distribution of particles having sizes in the range of from about 4 mesh to about 100 mesh (U.S. Standard Sieve numbers)(i.e. the particles pass through a screen opening of about 4760 microns (4 mesh) and are retained on a screen opening of about 150 microns (100 mesh)). Preferred proppant substrates have a distribution of particle sizes in the range of 8 mesh to 60 mesh, and more usually in the range of 16 mesh to 50 mesh (preferably at least 90% by weight of the particles satisfy such mesh size range). Particularly preferred proppant substrates have a distribution of particle sizes with at least 90% by weight of the particles having a size within the range of 20 mesh to 40 mesh.

In accordance with the present invention, the proppant substrate then is coated with a particulate lower density material such as a particulate cork. In the broadest aspects of the present invention the particulate lower density material typically has an actual, intrinsic, or inherent density of less than about 1.6 g/cc, preferably less than about 0.5 g/cc. Suitable materials for use as the particulate lower density material include particulate cork, particulate low density woods, such as balsa, bamboo, pine and red cedar, and particulate, preferably foamed plastics, such as phenolics, urethanes, polyesters, epoxies and ureas.

Preferably, the particulate lower density material is supplied as particulates (particles) having a particle size smaller than the proppant substrate for attaching to the surface of the proppant substrate. Preferably, the lower density material particulates have a distribution of particles sized in the range of 30 mesh to 635 mesh (U.S. Standard Sieve numbers), i.e., particle sizes between 600 and 20 microns. As is conventional, when a mesh size range is recited, it means that the distribution of particles pass through the screen with the more open mesh size recited in the range and are retained on the screen having the less open (more closed) mesh size recited in the range. For the most part, at least 90% by weight of the particles in a given sample are intended to have the recited distribution. Usually, the lower density material particulates have a distribution of particles sizes in the range of 100 mesh to 200 mesh, i.e., particle sizes between 150 and 75 microns.

To prepare the composite proppant of the present invention, the lower density material particulates are adhered to the surface of the proppant substrate. In a preferred embodiment of the present invention this is accomplished by affixing the lower density material particulates to the surface of the proppant substrate using an adhesive binder resin. An adhesive typically is applied in an amount of 1 to 10 weight percent of the proppant substrate, and more usually in an amount of 2 to 5 percent. In the broadest aspect of the invention a wide variety of adhesives can be used, including phenolic resins, urea resins, isocyanate resins, epoxy resins and the like. The nature of the adhesive resin is not narrowly critical.

One particularly common adhesive for use in the present invention is the class of phenol-formaldehyde novolac resins commonly used to coat conventional proppants. Phenol-formaldehyde novolac resins can be produced by reacting a molar excess of phenol with formaldehyde in the presence of an acid catalyst, such as sulfuric acid, hydrochloric acid or, oxalic acid (usually in an amount of 0.2 to 2% by weight based on the phenol). Maintaining the mole ratio of phenol to formaldehyde at, for example, 1:0.7-0.9, is common when preparing such resins. However, the present invention is not to be limited to any particular type of novolac resin.

Novolac resins are thermoplastic, i.e., they are not self-crosslinkable. Novolac resins are converted to cured resins by, for example, reacting them under heat with a crosslinking agent, such as hexa (also called hexamine or hexamethylenetetramine), or for example, by mixing them with a solid acid catalyst and paraformaldehyde and reacting them under heat. Novolac resins also may be cured with other cross linkers such as resoles and epoxies.

Novolac resins have long been used for coating of proppants. A solid novolac resin, generally in flake form, is added to preheated proppant (200° F. to 400° F.)(about 93° C. to about 204° C.) in a suitable production coater, the temperature being above the melt point of the novolac (typically 170° F. to 200° F.)(about 77° C. to about 93° C.). The heat causes the novolac resin to melt and the mixing action uniformly coats the surface of the proppant. Subsequent to achieving uniform coating, an aqueous solution of hexa typically is added. The added water cools the coated proppant through evaporation as the hexa is distributed throughout the resin. This cooling rapidly drops the temperature of the coated proppant and initially prevents the curing of novolac resin by the hexamine. The so-coated proppant can be discharged at this point, further cooled and screened. When used, the presence of the hexamine in the novolac coating allows the coating to cure under the elevated temperature conditions encountered in the subterranean formation (cured-in-place). In an alternative process, the novolac-hexamine coating may be allowed to achieve full cure in the mixer prior to discharge of the coated proppant (pre-cured coating). These coating and curing techniques are well known and understood in the prior art and can be adapted with only routine experimentation for use in affixing the particulate lower density material to the proppant substrate in connection with the present invention.

In accordance with the present invention, the conventional procedure for making a coated proppant with a novolac resin is modified by including the lower density coating material particles along with the molten novolac resin and proppant in the mixing operation. Thus, when the coating is cooled, the lower density coating material particles become adhered to the surface of the proppant substrate though the adhesive action of the novolac resin. Alternatively, the lower density coating material particles can be added to the solid novolac resin in an operation separate from, i.e., prior to, the coating operation. Then the resin with the embedded lower density coating material particles is used to coat the proppant substrate.

In another embodiment of the invention, the adhesive used to adhere the lower density coating material particles to the proppant substrate may be a thermoplastic resin of the type disclosed in co-pending U.S. application Ser. No. 11/456, 897, published as US 2008-0011477 A1, the disclosure of which is incorporated herein by reference.

In particular, various types of thermoplastic materials that may be used as an adhesive for adhering the lower density coating material particles to the proppant substrate in this embodiment of the invention broadly include polyethylene; polypropylene; SIS (styrene-isoprene-styrene) copolymers; ABS copolymers (i.e., acrylonitrile-butadiene-styrene); SBS (styrene-butadiene-styrene) copolymers; polyurethanes; EVA (ethylene vinyl acetate) copolymers; polystyrene; acrylic polymers; polyvinyl chloride and other similar fluoroplastics; pine rosins and modified rosins, such as rosin esters including glycerol rosin esters and pentaerythritol rosin esters; polysulfide; EEA (ethylene ethyl acrylate) copolymers; styrene-acrylonitrile copolymers; nylons, phenol-formaldehyde novolac resins, waxes and other similar materials and their mixtures. Particularly preferred for use as the thermoplastic adhesive material are those substances commonly referred to as hot melt adhesives. For example, hot melt adhesives such as Opt-E-Bond™ HL0033 manufactured by the HB Fuller Co., and Cool-Lok™ 34-250A manufactured by National Adhesives may be used as an adhesive for attaching the particulate lower density materials to the crush resistant proppant substrate. Other adhesive options include pine rosins and modified rosins marketed by Georgia-Pacific Corporation as NOVARES® 1100 and NOVARES® 1182.

One of the benefits of using such a thermoplastic resin as the adhesive is that after the thermoplastic coated proppants is lodged in a fracture, thermal energy in the subterranean formation causes the thermoplastic to become tacky (sticky) and fuse with other similarly thermoplastic-coated proppants to form a supporting framework for keeping the fracture open. Furthermore, the tacky (sticky) nature of the thermoplastic coated proppants is expected to help keep the particulate lower density coating material from eroding from the proppant substrate and/or helps to capture any eroded particulates and may also capture other loose solid particulates in flowbacks. As such, the amount of solid material that is extracted with the desired hydrocarbon, e.g., petroleum, may be controlled or reduced.

In one specific example of the present invention, a particulate cork material is mixed with a molten thermoplastic resin and is coated on a proppant substrate to lower the density (increase the buoyancy) of the composite proppant. Thus, not only is the composite proppant provided with an inherent tackiness, the composite proppant also has an enhanced buoyancy due to the adherence of the lower density coating material particles on the proppant.

The amount of lower density coating material particulates used in coating the proppant substrate may range from about 0.1 weight % to about 20 weight % based on the weight of the proppant substrate and is usually expected to be applied in an amount between about 1 and 10% by weight. In one particular arrangement, a cork particulate material may comprise 2 weight % to 3 weight % of a proppant's weight. Higher amounts also can be used and the present invention should not be limited to these amounts.

As noted above, the proppant substrates coated with the lower density particulate material may include commonly used proppant substrates such as silica sand, ceramics, bauxite and the like, as well as their resin pre-coated alternatives, as well as newer crush resistant proppant substrates. Traditionally, more viscous fluids were required to carry these types of proppants greater distances into a fractured subterranean formation due to their relatively higher densities (higher specific gravities). However, by attaching the lower density particulate materials, such as particulate cork, on the surface of the proppant these proppant substrates may be carried using less viscous fluids (than traditionally used) to transfer the proppants a similar or greater distance into the fractured formation.

With respect to size, composite proppants of the present invention typically have a particle size distribution in the range of about 14 mesh to 100 mesh (mesh size according to the U.S. Standard Sieve Series). Generally, at least 90% by weight of the particulates (e.g., composite proppants) added to the treating or fracturing fluid have a size falling within this range. Preferably, at least 90% by weight of the particulates have a size distribution of 8 to 60 mesh, and more preferably 16 to 50 mesh. In some particularly preferred arrangements, at least 90% by weight of the particulates have a particulate distribution size in the range of 20 mesh to 40 mesh.

According to one or more embodiments, proppant substrates of lower apparent specific gravity may also be used. These types of proppants may include natural or synthetically produced materials and structures such as hollow glass balls, walnut hulls and porous ceramics. These proppants generally have a lower crush resistant threshold than conventional proppants. Using proppants having a relatively lower apparent specific gravity further reduces the viscosity and pressure required to pump the fluid carrying the proppant through the subterraneous formation. Attaching less dense particulate materials to these types of proppants may further increase the distance the proppants are able to travel prior to settling. Additionally or alternatively, attaching less dense particulate materials to proppants having lower apparent specific gravities may allow well drilling operations to further lower the viscosity of the fracture or treating fluid. Lowering the viscosity of the treating fluid may also further reduce the amount of power or pressure required to pump the fluid the necessary distance. Again, the tradeoff with these materials, however, is their lower crush resistant threshold While the discussion herein refers to well drilling operations in particular, one of ordinary skill in the art will appreciate that the use of high buoyancy composite proppants according to the present invention may be used in a variety of other applications and operations. For example, in addition to the oil drilling operations discussed above, high buoyancy composite proppants may be used in gravel packing procedures in which a screening device is placed in a wellbore. Other hydrocarbon recovery-related operations may also benefit from the use of higher buoyancy proppants as will be apparent to a worker skilled in such related procedures.

As noted above, the composite proppants described herein may be prepared using a variety of processes. In one example, a particulate cork-coated silica sand may be prepared by initially heating the uncoated sand, adding a hot melt adhesive and mixing the sand with the adhesive for a predefined amount of time. Subsequently, particulate cork material may be added to the heated mixture, coating the silica sand with the cork particles. The formation of the composite proppant may include multiple steps of adding adhesive to insure that the cork material coats the silica sand sufficiently. Once the sand has been sufficiently coated with the cork material particles, the composite proppant is cooled and discharged, and then screened to the desired particle size distribution.

One of ordinary skill in the art will appreciate that the amount of substrate, resin and particulate coating material may vary based on the desired degree of coating, weight of the substrate, type of substrate, type of coating material, type of resin and other factors.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

Comparative Example 1

A proppant substrate material (e.g., about 3000 g of 20/40 frac sand or a porous ceramic (such as the 20/40 porous ceramic available commercially from Carbo Ceramics)) is preheated in an oven and the preheated substrate then is added to a preheated mixer such as a mill and allowed to equilibrate at a temperature of about 400° F. (about 204° C.). When the proppant substrate temperature reaches 400° F. (about 204° C.), a frac sand novolac resin (e.g., Georgia-Pacific GP-2202 frac resin) is added to the heated proppant and then mixed for about fifteen seconds. Then, about 9 g of a powder mixture of 98 wt. % hexamine and 2 wt. % wax powder is added to the proppant/molten resin mixture and mixed for about fifteen additional seconds. Subsequently, an additional amount of the resin (about 120 g) is added and mixed for another fifteen seconds. Then, more hexamine/wax powder mixture (about 18.4 g) is added and mixing is continued for two minutes. The coated proppant is then discharged after the two minutes and subsequently can be screened to a desired particle size.

Example 2

The procedure of Example 1 was repeated with two differences. First, after the first portion of the hexa wax powder has been mixed, 50 g of powdered (particulate) cork is added and mixed for about 20 seconds. Then, after the addition of 120 g of additional GP-2202, mixing is continued for 30 seconds, not just 15 seconds. The coated proppant is then discharged after the two minutes and subsequently can be screened to a desired particle size.

The following Table shows the apparent specific gravities of representative proppants made using the procedures of Examples 1 and 2.

|  | 20/40 Frac Sand | 20/40 Porous Ceramic |
| --- | --- | --- |
| Example 1 | 2.37 | 1.96 |
| Example 2 | 2.18 | 1.94 |

FIG. 1 is a scanning electron microscopic image of the composite proppant of this example having particulate cork attached by the resin adhesive to the surface of the proppant substrate.

In one simulation, fifty grams of each of the coated frac sand proppant of Example 1 and the composite frac sand proppant of Example 2 were mixed together and suspended in three hundred milliliters of thickened fracture fluid to model the transport of the proppants through a fracture fluid. The proppant of Example 1 was colored red using 2 g of a red pigment, while the proppant of Example 2 was colored blue using 2 g of a blue pigment. In the simulation, the cork coated sand proppants took longer to settle out and a greater fraction ended up on the top of the settled packet, as demonstrated by the separation of the colored layers.

The present invention has been described with reference to specific embodiments. However, this application is intended to cover those changes and substitutions that may be made by those skilled in the art without departing from the spirit and the scope of the invention. Unless otherwise specifically indicated, all percentages are by weight. Throughout the specification and in the claims the term "about" is intended to encompass + or −5%.

We claim:

1. A method for treating a subterranean formation comprising introducing into fractures in the formation particles comprising a composite proppant, said composite proppant comprising a proppant substrate capable of withstanding a closure pressure of at least about 5,000 psi and having an adhered coating of a particulate material with an actual density less than an apparent density of the proppant substrate, wherein the particulate material has an actual density of less than 0.5 g/cc, and wherein at least 90 wt % of the particulate material has a particle size distribution ranging from 75 µm to 150 µm.

2. The method of claim 1, wherein the proppant substrate is selected from the group consisting of bauxite, silica sand and porous ceramic, optionally coated with a resin.

3. The method of claim 1, wherein the adhered coating of particulate material comprises a particulate cork.

4. The method of claim 3, wherein the particulate cork comprises 2% to 3% by weight of the composite proppant.

5. The method of claim 1, wherein the particulate material is adhered to the proppant substrate using a hot melt adhesive.

6. The method of claim 1, wherein the particulate material is adhered to the proppant substrate using a novolac resin crosslinked with hexamine.

7. The method of claim 5, wherein the hot melt adhesive includes a thermoplastic resin.

8. The method of claim 1, wherein the adhered coating of particulate material comprises 0.1% to 20% by weight of the composite proppant.

9. A particulate composite proppant, comprising:
a proppant substrate capable of withstanding a closure pressure of at least about 5,000 psi; and
an adhered coating of a particulate material with an actual density less than an apparent density of the proppant substrate, wherein the particulate material has an actual density of less than 0.5 g/cc, and wherein at least 90 wt % of the particulate material has a particle size distribution ranging from 75 µm to 150 µm.

10. The particulate composite proppant of claim 9 further comprising an adhesive adhering the particulate material to the proppant substrate.

11. The particulate composite proppant of claim 10, wherein the adhesive includes a thermoplastic resin.

12. The particulate composite proppant of claim 10, wherein the adhesive includes a wax powder.

13. The particulate composite proppant of claim 10, wherein the adhesive includes a thermosetting resin.

14. The particulate composite proppant of claim 9, wherein the adhered coating of particulate material comprises a particulate cork.

15. The particulate composite proppant of claim 14, wherein the particulate cork comprises 2% to 3% by weight of the particulate composite proppant.

16. The particulate composite proppant of claim 9, wherein the proppant substrate comprises at least one of a porous ceramic, silica sand, bauxite and hollow glass, optionally having a resin coating.

17. The particulate composite proppant of claim 15, wherein the proppant substrate comprises a particulate silica sand.

18. The particulate composite proppant of claim 10, wherein the particulate material comprises 0.1% to 20% of the composite proppant by weight.

19. The particulate composite proppant of claim 9, wherein the proppant substrate is capable of withstanding a closure pressure of at least about 7,500 psi.

20. The particulate composite proppant of claim 9, wherein the particulate material is adhered to the proppant substrate with an adhesive comprising a hot melt adhesive.

* * * * *